(12) United States Patent
Song et al.

(10) Patent No.: US 8,928,626 B2
(45) Date of Patent: Jan. 6, 2015

(54) OPTICAL NAVIGATION SYSTEM WITH OBJECT DETECTION

(75) Inventors: Willie Song, Penang (MY); Zi Hao Tan, Penang (MY); Shan Chong Tan, Penang (MY)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 924 days.

(21) Appl. No.: 13/095,576

(22) Filed: Apr. 27, 2011

(65) Prior Publication Data

US 2012/0274606 A1 Nov. 1, 2012

(51) Int. Cl.
| | |
|---|---|
| G06F 3/042 | (2006.01) |
| G09G 5/00 | (2006.01) |
| G06F 3/033 | (2013.01) |
| G09G 5/08 | (2006.01) |
| G01J 1/20 | (2006.01) |
| G06F 3/0354 | (2013.01) |

(52) U.S. Cl.
CPC ............ *G06F 3/042* (2013.01); *G06F 3/03547* (2013.01); *G06F 2203/0338* (2013.01)
USPC ........... 345/175; 345/156; 345/157; 345/166; 250/201.1

(58) Field of Classification Search
CPC .......... G06F 2203/0338; G06F 3/0421; G06K 9/00026
USPC .................................................. 345/156–184
See application file for complete search history.

(56) References Cited

U.S. PATENT DOCUMENTS

| | | | |
|---|---|---|---|
| 6,144,366 A | * | 11/2000 | Numazaki et al. ............ 345/156 |
| 6,797,937 B2 | | 9/2004 | Norskog et al. |
| 7,463,756 B2 | | 12/2008 | Benkley, III |
| 7,609,864 B2 | | 10/2009 | Nagasaka et al. |
| 2006/0132442 A1 | * | 6/2006 | Hunter et al. .................. 345/166 |
| 2008/0006762 A1 | * | 1/2008 | Fadell et al. ............... 250/201.1 |
| 2010/0079411 A1 | | 4/2010 | Lee et al. |
| 2010/0127977 A1 | | 5/2010 | Sung et al. |

* cited by examiner

*Primary Examiner* — Sumati Lefkowitz
*Assistant Examiner* — David Tung

(57) ABSTRACT

An optical finger navigation system with object detection is provided for preventing cursor movement if a user's finger has been lifted from the navigation surface. The optical finger navigation system may include a light source, an image sensor and an object detection engine. The object detection engine may be operatively coupled with the image sensor and the light source to selectively report motion data upon determining the presence of an object by comparing a scaled-up pixel value with a threshold value. The lift detection engine may be incorporated in a microcontroller, wherein the microcontroller may be added to a navigation system to provide an additional object detection feature.

19 Claims, 4 Drawing Sheets

OPTICAL NAVIGATION SYSTEM WITH OBJECT DETECTION

BACKGROUND

Optical navigation sensors are conventionally used for surface navigation in an input device such as an optical mouse. A conventional input device tracks the relative movement between a navigation surface and an image sensor within the input device. Light is illuminated towards the navigation surface or a target object by a light source. In general, images of the illuminated navigation surface or multiple frames of digital image data of the illuminated target object are captured by the sensor and subsequently processed and further translated as a cursor movement on the input device.

More recently, optical finger navigation devices have been widely used in many portable handheld devices, such as a mobile handset. An optical finger navigation device permits the user to manipulate the navigation function by simply moving a finger on a finger interface surface of such a portable device. In contrast to a conventional optical mouse system, an optical finger navigation device uses a light source to illuminate the user's finger. The general operational concept of an optical finger navigation device is similar to a conventional optical mouse, except that the sensor incorporated in for finger navigation is generally positioned facing upward from the device, rather than downward. In addition, the tracking surface for the optical finger navigation system is a user's finger, instead of a desktop work surface.

With an optical finger navigation device that is manually manipulated, there is a need to recognize when the finger has been lifted off the navigation surface. For the purpose of power saving, as well as preventing cursor skating, it is important to have the navigation operation be temporarily suspended when the finger has been lifted off the navigation surface. There are conventional lift detection systems or object detection systems that can be implemented in order to prevent the input device from tracking that may be based on image defocus or image surface quality value. However, these systems typically involve complex design and are usually integrated as part of the navigation system during the chip design. Furthermore, some object detection systems may require the sensor to capture multiple images for comparison; which would require the LED to be turned on at all times.

Another known limitation of many finger navigation devices is the unintended cursor movement when a finger is initially placed on the navigation surface, or as it is being lifted off the navigation surface. Such placing and lifting of a finger can cause unintended cursor jittering, unintended cursor movement, or sudden jump of the cursor.

BRIEF DESCRIPTION OF THE DRAWINGS

Throughout the description and figures, similar reference numbers may be used to identify similar elements.

DETAILED DESCRIPTION

Figure 1:
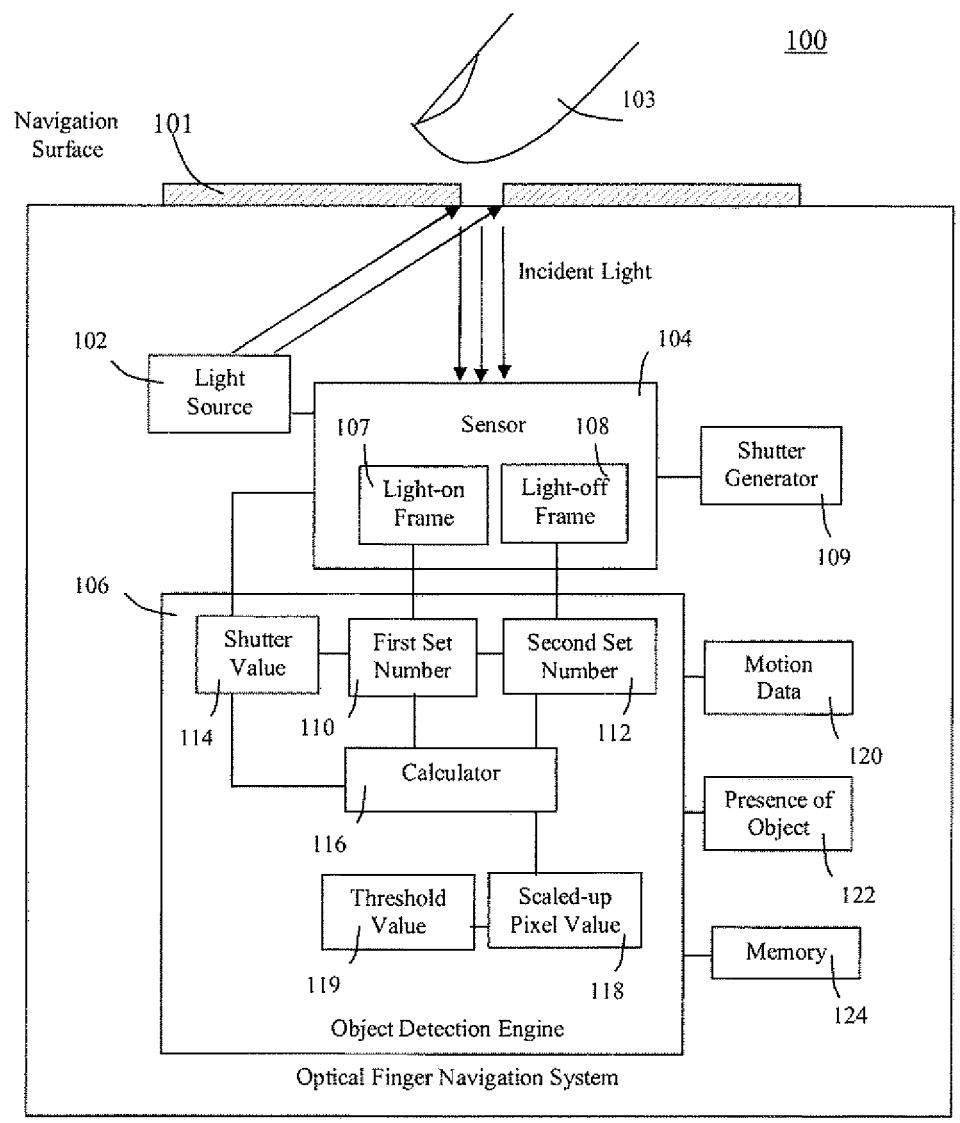
FIG. 1 illustrates a schematic block diagram of one embodiment of an optical navigation system with object detection.

Optical finger navigation (hereinafter OFN) devices are suitable for small handheld electronic devices, such as mobile phones, remote controls, game console controllers or portable music players that normally require a navigation function that can be operated by a user's finger. For example, an OFN may be incorporated into a mobile phone to provide finger navigation within the graphical user interface of the device. FIG. 1 illustrates a schematic block diagram of an OFN system 100 with object detection. The OFN system 100 includes a light source 102 for emitting light, a sensor 104 coupled to the light source 102 and an object detection engine 106 coupled to the sensor 104. Although certain component parts are shown in conjunction with the OFN system 100 of FIG. 1, other embodiments may implement fewer or more component parts for providing a similar navigation with object detection function. In one embodiment, the OFN system 100 may be implemented as a single chip system whereby the image sensor 104, the lift detection engine 106 and the light source 102 may be integrated as a single integrated circuit (IC) chip system. The object detection engine may be incorporated in many input devices, such as a mouse, an optical finger navigation controller, or other similar input devices. However, in order to simplify the illustration, an OFN will be used to represent the input device in the description of the embodiments.

As described in more detail below, in one embodiment, the OFN system 100 may be configured to permit navigation operations only when a finger 103 is reported present on the navigation surface 101 of the handheld device (not shown). The OFN system 100 may be incorporated into a handheld device to track the movement of the user's finger 103 relative to the navigation surface 101. The OFN system may include a light source 102 to emit light pulses towards the navigation surface 101 and image sensor 104 to capture the incident light directed towards the sensor 104.

In one embodiment, the light source 102 may be any suitable source of electromagnetic radiation, which is capable of emitting light at a desirable wavelength and intensity. In general, the light source 102 may be a coherent or a non-coherent light source. The selection of the light source 102 may be preferably based on its application. The light source 102 may be a visible or a non-visible light source (e.g., IR LED) and certain applications may benefit from more than one light source.

The sensor 104 includes a plurality of photo sensitive elements (not shown) or electrodes and may be coupled with a shutter recorder 109. In one embodiment, the sensor 104 may be operable to receive incident light coming from the navigation surface 101. Specifically, if a finger 103 is placed at or near the navigation surface 101, the sensor 104 may capture the reflected finger image coming from the detection area 101. The sensor 104 may capture a series of image frames of the finger 103 and compare successive image frames to determine the motion data 120. The sensor 104 may determine the relative motion between the finger 103 and the navigation surface 101 in terms of movement vectors in the directional delta X and delta Y. The OFN system 100 may subsequently process and further translate the finger movement to a corresponding cursor movement on the handheld device. The image sensor 104 may be a CCD (Charge Coupled Device), a CMOS (Complimentary Metal Oxide Semiconductor), or any other type of optical sensor known in the art.

In one embodiment, the sensor 104 is coupled to the light source 102 and configured to capture a light-on frame 107 and subsequently a light-off frame 108 corresponding to light pulses generated by the light source 102. The sensor 104 may be configured to capture a light-on frame 107 when the light source 102 is on and subsequently a light-off frame 108 when the light source 102 is off. In one embodiment, the sensor 104 is configured to capture both the light-on frame 108 and light-off frame 108 under the same shutter value 114. The sensor 104 may be coupled with a shutter generator 109 configured to generate shutter values 114 in response to the brightness of the light being received by the sensor 104. The shutter generator 109 may generate a low shutter value 114 when the sensor 104 receives light of high intensity and generate a high shutter value 114 when the light is dimmer, in accordance with the exposure algorithm of the sensor 104. Therefore, if a finger 103 is placed on the detection area 101, the light emitted by the light source 102 may be reflected fully onto the sensor 104. Thus, the sensor 104 is expected to receive image data having a substantially similar brightness as the light that is emitted by the light source 102. Conversely, if there is no finger 103 on the detection area 101 to reflect the light pulses emitted by the light source 102, the incident light, if any, received by the sensor 104 will be substantially ambient light.

In one embodiment, the image sensor 104 may include a plurality of photosensitive pixel elements (not shown) configured to receive an image reflected from the navigation surface 101. The photosensitive pixel elements of the image sensor 104 that are integrated to produce a good image may be referred to as the set number of active photosensitive pixel elements used for acquiring the image. For example, the number of pixel elements used for acquiring an image frame may vary in accordance to the brightness level or quality of the image. In particular, the sensor 104 may require a different number of pixel elements for capturing the light-on frames 107 and light-off frames 108, respectively.

In one embodiment, the optical navigation system 100 may include an object detection engine 106 coupled to the image sensor 104. The object detection engine 106 may be configured to determine a first set number 110 for the photosensitive pixel elements used for acquiring light-on frames 107, a second set number 112 for the photosensitive pixel elements used for acquiring light-off frames 108, and a shutter value 114 used for capturing these two frames. The object detection engine 106 may further include a calculator 116 to calculate a scaled-up pixel value 118 based on the first set number 110, the second set number 112 and the shutter value 114. In one embodiment, the scaled-up pixel value 118 is calculated by first determining a pixel difference between the first set number 110 and the second set number 112. Then, a ratio of the pixel difference to the shutter value 114 is determined. And finally, the ratio is multiplied with a multiplying factor. In one embodiment, in order to determine whether an object is present or not, all the calculations of the scaled-up pixel value are transformed to the same absolute scale. Thus, in order to determine the presence of an object, all measured scaled-up pixel values are transformed utilizing the same scale factor, so that a single threshold may be applied to differentiate the presence or absence of an object.

In one embodiment, the object detection engine 106 may be configured to report motion data 120 if the scaled-up pixel value 118 is greater than a threshold value 119. In another embodiment, the object detection engine 106 may be configured to report the presence of object 122 upon determining the scaled-up pixel value 118 is greater than a threshold value 119. The threshold value 119 may be a predetermined minimum scaled-up pixel value 118 at which the object detection engine 106 detects the presence of an object, such as the finger 103. For example, threshold number 119 may be estimated through experiments by collecting a number of scaled-up pixel values 118 measured under various simulated environment situations, such as, for example, finger on, finger off, light-on, light-off, and in combination with various instances of external light levels.

The OFN system 100 may further include a memory 124 configured to store the shutter value 114 and the first set number 110. In one embodiment, the object detection engine 106 may be capable of performing the object detection operation without having to turn on the light source 102. Upon the detection of an absence of an object, the object detection engine 106 may be configured to perform the object detection operation without having to turn on the light source. The object detection engine 106 may be configured to calculate the scaled-up pixel value 118 for subsequent comparison by using the stored first set number 110, the stored shutter value 114 and a fresh second set number 112 from a freshly captured light-off frame 108. In one embodiment, only a "dark frame" or a light-off frame may be needed for the scaled-up pixel value calculation. The sensor 104 may be configured to capture only a light-off frame 108 and generate a second set number 112 for the photosensitive pixel elements used for acquiring the light-off frames 107. As the light source 102 is required to be turned on for the object detection operation, therefore the power consumption of the OFN system can be reduced significantly. In another embodiment, the object detection engine 106 may be configured to perform only simple processing steps of accumulating the scaled up pixel values 118, performing simple calculations and comparing. As a result, the system can be integrated into any system without requiring as much power consumption.

Figure 2:
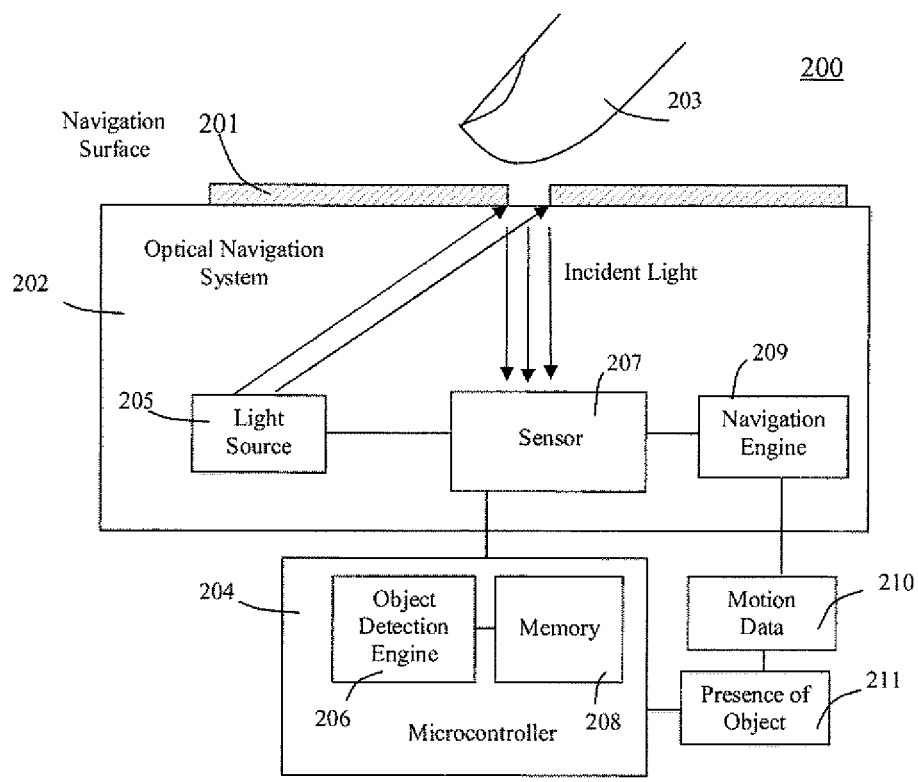
FIG. 2 illustrates a block diagram of another embodiment of an optical navigation system with object detection.

FIG. 2 shows a schematic block diagram of an OFN system 200 comprising at least an optical navigation system 202 and a microcontroller 204. The optical navigation system 202 may include a light source 205, a sensor 207 and a navigation engine 209. In one embodiment, the microcontroller 204 may include an object detection engine 206 and a memory 208. The microcontroller 204 may be operatively coupled to the optical navigation system 202 to control the navigation function of the OFN system 200. The microcontroller 204 may be configured to allow navigation operation upon determining the presence of an object, for example a finger 203, at the detection area of the navigation surface 201. Navigation operation of the OFN system 200 may be suspended when the finger 203 has been lifted off the navigation surface 201 of the handheld device (not shown). As such, the OFN system 200 can be effectively implemented on a handheld device to avoid unintended cursor jittering.

The microcontroller 204 may be configured to provide an object detection function or lift detection to the OFN system 200 and prevent the report of the motion data 210 if a finger 203 has been lifted from the navigation surface 201. In one embodiment, the microcontroller 204 may provide a flexible means for adding an extra object detection function to an optical navigation system 202, which previously did not have such a feature as part of the device. Therefore, the object detection function can be implemented with minimal effort onto an existing optical navigation system 202 without having to redesign the system. Various components of the navigation system 202 and the object detection engine 206 have been described with respect to FIG. 1 herein above. In one alternative embodiment, object detection engine 206 may be implemented into a microcontroller 204 in the form of an algorithm or firmware. The predetermined threshold value may also be stored in the memory 208 of the microcontroller 204 as part of firmware.

Figure 3:
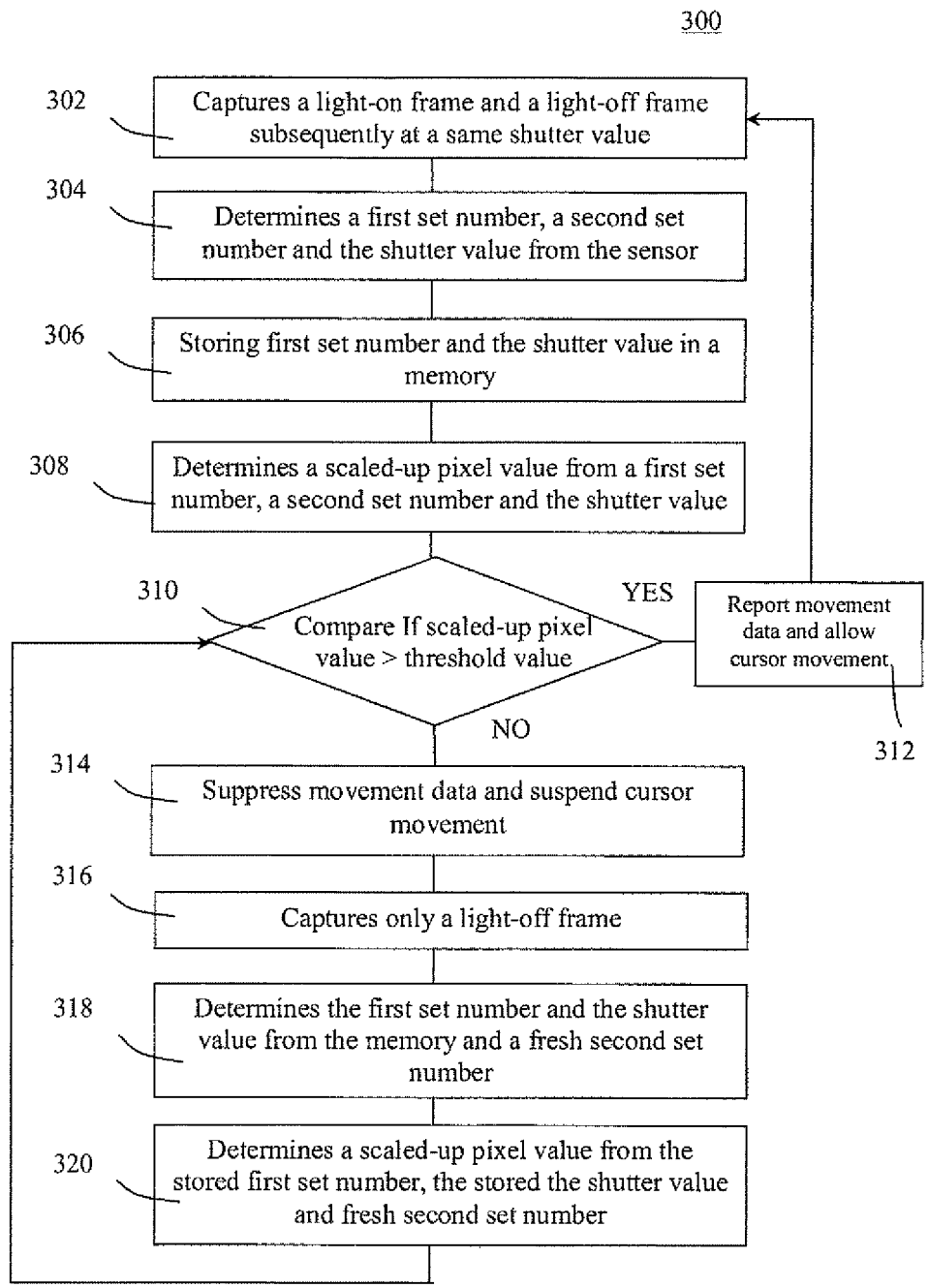
FIG. 3 illustrates a flow chart of a method of object detection operation.

FIG. 3 illustrates a block diagram of one embodiment of a method 300 for object detection in an OFN system. At block 302, the sensor 104 captures a light-on frame 107 and a light-off frame 108, subsequently at a same shutter value 114. At block 304, object detection engine 106 determines a first set number 110, a second set number 112 and the shutter value 114 from the sensor 104. In one embodiment, the first set number 110 and the second set number 112 are the number of photosensitive pixel elements used by the sensor 104 in acquiring the light-on and the light-off frames, respectively, under the same shutter value 114. At block 306, object detection engine 106 stores a first set number 110 and the shutter value 114 received from the sensor 104 in a memory 124. At block 308, the object detection engine 106 determines a scaled-up pixel value 118 based on the first set number 110, the second set number 112 and the shutter value 114. In one embodiment, the scaled-up pixel value 118 may be calculated by first, determining the pixel difference between the first set number 110 and the second set number 112; determining a ratio of the pixel difference to the shutter value 114; and multiplying the ratio with a multiplying factor.

At block 310, the object detection engine 106 detects an object by comparing the determined scaled-up pixel value 118 against a threshold value 119. In one embodiment, the threshold value 119 is a predetermined minimum scaled-up value 118, at which the object detection engine 106 detects the presence of an object, such as the finger 103. The object detection engine 106 reports a presence of an object if the scaled-up pixel value is greater than the threshold value 119. At block 312, if an object is detected, the object detection engine 106 reports the movement data and permits cursor movements in accordance with normal navigation operations. Conversely, at block 314, if an object is not detected, the object detection engine 106 suppresses the report of the motion data and suspends cursor movement. At block 316, if an object is not detected, the sensor 104 captures a light-off frame 108 at a shutter value 114, similar to before. At block 318, object detection engine 106 determines the first set number 110 and the shutter value 114 from the memory 124 and a fresh second set number. In one embodiment, the fresh second set number is the number of photosensitive pixel elements used by the sensor 104 in acquiring the new light-off frame. At block 320, the object detection engine 106 determines a scaled-up pixel value 118 from the stored first set number 110, the stored shutter value 114 and the fresh second set number.

Figure 4:
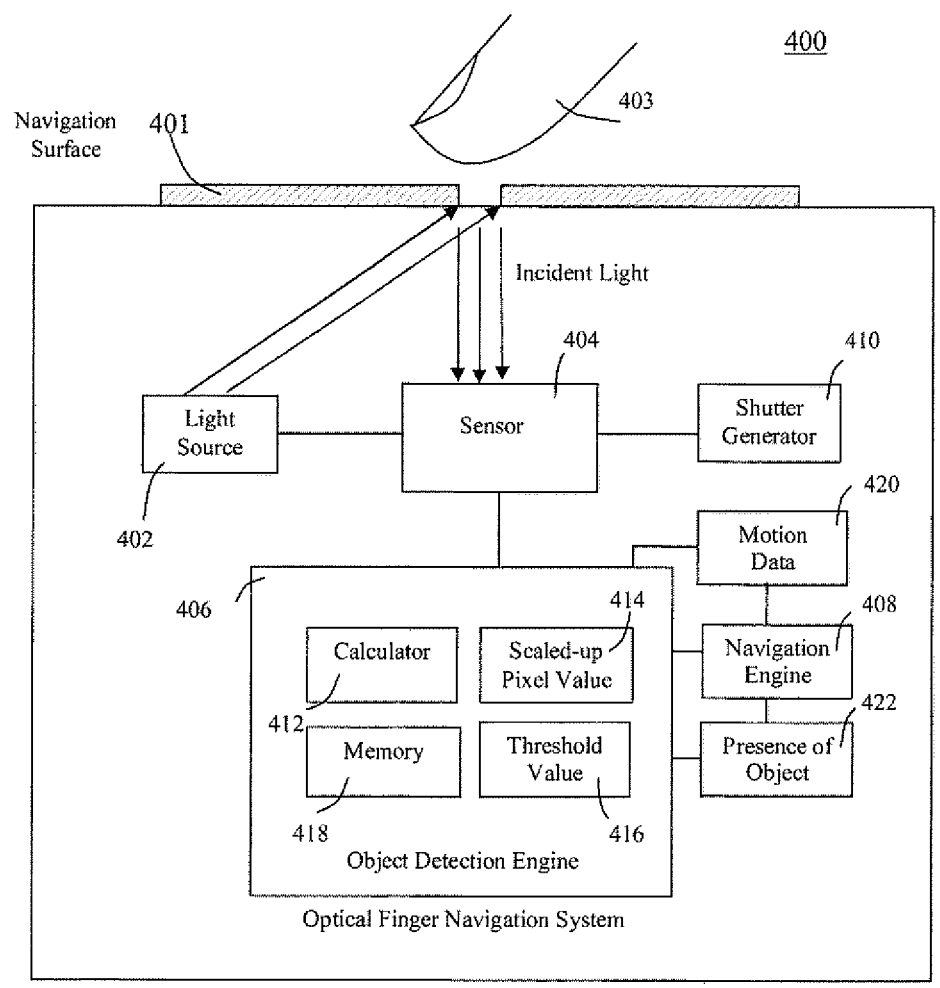
FIG. 4 illustrates a schematic block diagram of one embodiment of an optical finger navigation system.

FIG. 4 shows a schematic block diagram of one embodiment of an OFN system 400 suitable for small handheld electronic devices (not shown), such as mobile phones. The OFN system 400 may include a light source 402 for emitting light pulses towards the navigation surface 401 and image sensor 404 to capture the incident light directed towards the sensor 404. The OFN system 400 may include an object detection engine 406 coupled to the sensor 404. In this embodiment, the object detection engine 406 is operatively coupled to a navigation engine 408 to provide a navigation operation for maneuvering a graphical user interface (GUI) function (not shown) of the handheld device (not shown). The object detection engine 406 is configured to permit the navigation operation upon determining the presence of an object, such as a finger 403.

In one embodiment, the sensor 404 is coupled to the light source 402 and configured to capture a light-on frame and subsequently a light-off frame in correspondence to the light pulses generated by the light source 402 under a same shutter value generated by the shutter generator 410. The object detection engine 406 is coupled to the sensor 404 and may be configured to determine a set number for the photosensitive pixel elements used for acquiring the light-on and the light-off frames from the sensor 404. The object detection engine 406 may further include a calculator 412 to calculate a scaled-up pixel value 414 based on the set numbers and the shutter value. The detail operation on how the of the object detection engine 406 determines the scaled-up value 414 will not be elaborated further here as this has been described in detail with respect to FIG. 1.

In one embodiment, the object detection engine 406 may be operable to selectively report the motion data 420 if the scaled-up pixel value 414 is greater than a threshold value 416. In another embodiment, the object detection engine 406 may be configured to report the presence of an object 422 upon determining that the scaled-up pixel value 414 is greater than a threshold value 416. In one embodiment, the object detection engine 406 is coupled with a navigation engine 408 to provide a navigation function upon the detection of an object. The navigation engine 408 may be configured to operate only when an object, for example a finger 403, has been reported present at the detection area 401. Hence, the object detection engine 406 can be effectively implemented to immediately suspend the navigation operation when the finger 403 has been lifted off the navigation surface of the handheld device (not shown). As such, the OFN system 400 can be effectively implemented on a handheld device (not shown) to avoid unintended cursor jittering or sudden jump of the cursor when a finger 403 is initially placed on the navigation surface 401 or as it is being lifted off the navigation surface 401 of the handheld device (not shown). In addition, as has been described previously, the object detection engine 406 is able to perform the object detection operation without having to turn on the light source 402. Accordingly, power savings may also be further achieved.

The OFN system 400 may include a memory 418 configured to store the shutter value 114 and the first set number 110. In one embodiment, the memory 418 may be integrated as a part of the object detection engine 406. The object detection engine 406 may be configured to calculate the scaled-up pixel value 414 by using the stored first set number, the stored shutter value together with a new second set number obtained from a fresh light-off frame without having to turn on the light source 402. In other words, only a "dark frame" is needed for the scaled-up pixel value 414 calculations. As a result, the power consumption of the OFN system may be significantly reduced.

Although the operations of the methods herein are shown and described in a particular order, it will be understood by those skilled in the art, that the order of each method may be altered, for example, so that certain operations may be performed in a different, in an inverse order, or so that certain operations may be performed, at least in part, concurrently with other operations.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An optical navigation system comprising:
a light source configured to emit light;
a sensor configured to capture a light-on frame and a light-off frame; wherein both frames are captured at a shutter value;
an object detection engine coupled to the sensor, the object detection engine configured to determine a first set number for photosensitive pixel elements used in acquiring the light-on frame and a second set number for photosensitive pixel elements used in acquiring the light-off frame, the object detection engine is configured to report a motion data by comparing a scaled-up pixel value with a threshold value; and a calculator of the object detection engine configured to calculate the scaled-up pixel value, wherein the calculator is configured to determine a pixel difference between the first set number and the second set number to determine a ratio of the pixel difference to the shutter value, and to multiply the ratio with a multiplying factor.

2. The optical navigation system of claim 1, wherein the object detection engine is configured to report the motion data if the scaled-up pixel value is greater than the threshold value.

3. The optical navigation system of claim 1, wherein the object detection engine is configured to report a presence of an object if the scaled-up pixel value is greater than the threshold value.

4. The optical navigation system of claim 3, wherein the object detection engine is configured to report the motion data upon determining the presence of the object.

5. The optical navigation system of claim 3, wherein the threshold value is a predetermined minimum scaled-up value at which the object detection engine detects the presence of the object.

6. The optical navigation system of claim 1, further comprising a memory configured to store the threshold value, the first set number and the second set number.

7. The optical navigation system of claim 6, wherein the object detection engine is configured to calculate subsequent scaled-up pixel value without the light-on frame.

8. The optical navigation system of claim 7, wherein the object detection engine is configured to calculate subsequent scaled-up value based on the first set number and the shutter value stored in the memory, and a new second set number from a current light-off frame.

9. An optical navigation method comprising:
capturing a light-on frame and a light-off frame at a same shutter value;
determining a first set number for photosensitive pixel elements used in acquiring the light-on frame and a second set number for photosensitive pixel elements used in acquiring the light-off frame;
calculating the scaled-up pixel value based on the first set number, the second set number and the shutter value at least by:
determining a pixel difference between the first set number and the second set number; and
determining a ratio of the pixel difference to the shutter value, and multiplying the ratio with a multiplying factor;
reporting a motion data upon determining a presence of an object by comparing the scaled-up pixel value with a threshold value.

10. The method of claim 9, further comprising reporting the motion data upon determining the scaled-up pixel value is greater than the threshold value.

11. The method of claim 9, further comprising reporting the presence of the object if the scaled-up pixel value is greater than the threshold value.

12. The method of claim 9, wherein the threshold value is a predetermined minimum scaled-up value at which the object detection engine detects the presence of the object is detected.

13. The method of claim 9, further comprising storing the first set number and the second set number and the threshold value in a memory.

14. The method of claim 13, further comprising calculating a subsequent scaled-up value based on the first set number and the shutter value stored in the memory, and a new second set number from current light-off frame.

15. An optical navigation device comprising:
a light source configured to emit light;
a sensor configured to capture a light-on frame and a subsequent light-off frame wherein both frames are captured at a same shutter value;
a navigation engine configured to provide a navigation operation; and
an object detection engine coupled to the sensor and the navigation engine, the object detection engine configured to determine a first set number for photosensitive pixel elements used in acquiring the light-on frame and a second set number for photosensitive pixel elements used for acquiring the light-off frame, the object detection engine is configured to report a motion data for navigation operation by comparing a scaled-up pixel value with a threshold value;
wherein the object detection engine is configured to calculate the scaled-up pixel value using the first set number, the second set number and the shutter value, and
wherein the object detection engine is configured to calculate subsequent scaled-up pixel value without a light-on frame.

16. The optical navigation device of claim 15, wherein the object detection engine is configured to report the motion data if the scaled-up pixel value is greater than the threshold value.

17. The optical navigation device of claim 15, wherein the object detection engine comprises a calculator configured to calculate the scaled-up pixel value.

18. The optical navigation device of claim 17, wherein the calculator is configured to determine a pixel difference between the first set number and the second set number.

19. The optical navigation device of claim 18, wherein the calculator is configured to determine a ratio of the pixel difference to the shutter value, and configured to multiply the ratio with a multiplying factor.

* * * * *